July 4, 1961 J. R. STURGEON 2,991,461

ANALOGUE-TO-DIGITAL CONVERTERS

Filed June 3, 1957

4 Sheets-Sheet 1

Inventor
John Royal Sturgeon
By
Stevens, Davis, Miller & Mosher
Attorneys

Inventor
JOHN ROYAL STURGEON
By Stevens, Davis, Miller & Mosher
Attorneys

July 4, 1961 J. R. STURGEON 2,991,461
ANALOGUE-TO-DIGITAL CONVERTERS
Filed June 3, 1957 4 Sheets-Sheet 3

John Royal Sturgeon
Inventor
By Stevens, Davis, Miller & Mosher
Attorneys

July 4, 1961 J. R. STURGEON 2,991,461

ANALOGUE-TO-DIGITAL CONVERTERS

Filed June 3, 1957 4 Sheets-Sheet 4

*Inventor*
JOHN ROYAL STURGEON
By Stevens, Davis, Miller & Mosher
*Attorneys*

United States Patent Office 2,991,461
Patented July 4, 1961

2,991,461
ANALOGUE-TO-DIGITAL CONVERTERS

John Royal Sturgeon, Farnborough, England, assignor to National Research Development Corporation, London, England, a British corporation Filed June 3, 1957, Ser. No. 663,240
Claims priority, application Great Britain June 5, 1956
19 Claims. (Cl. 340—347)

Figure 1:
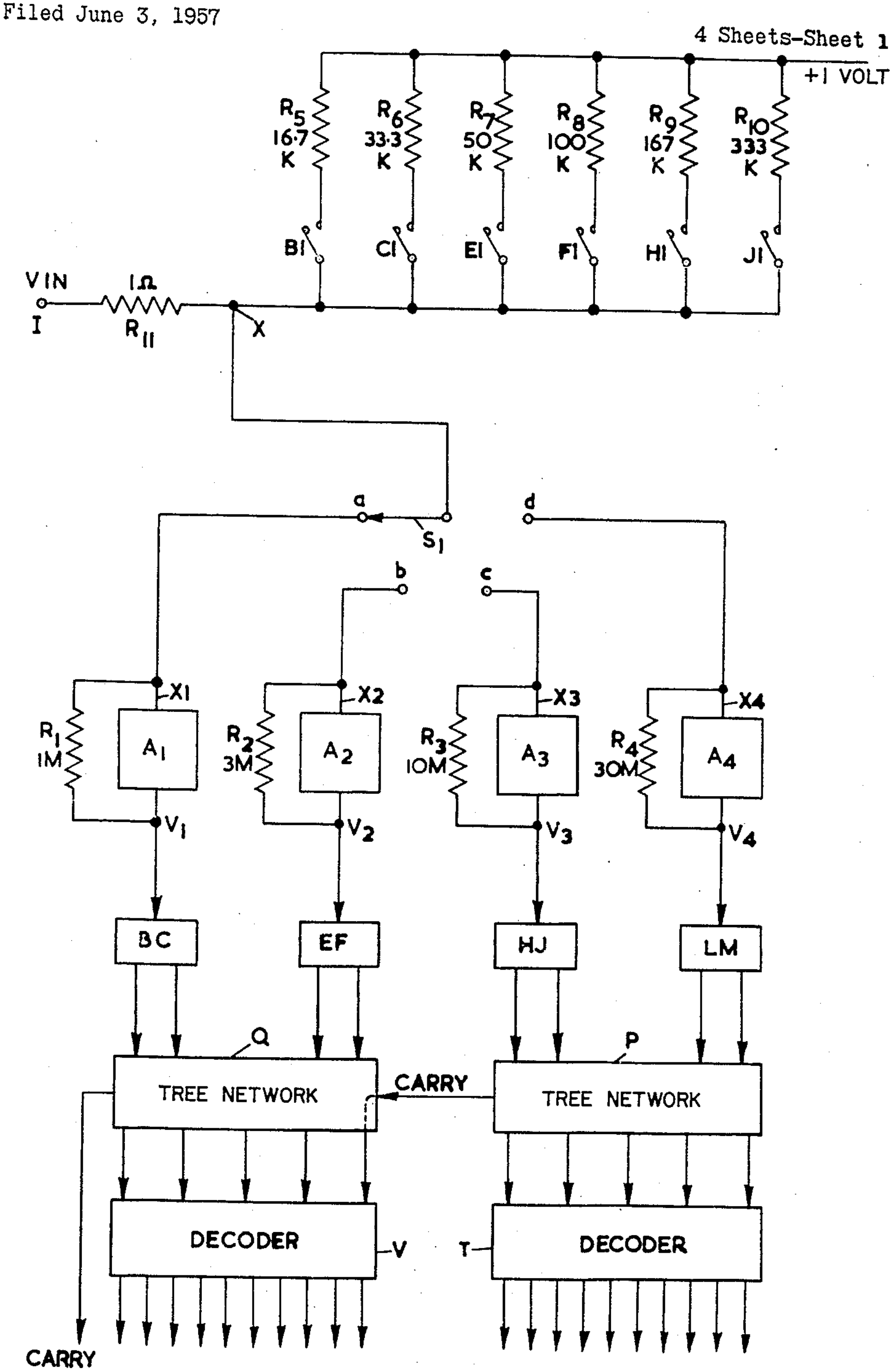

The present invention relates to analogue-to-digital converters in which an analogue representation of a physical quantity, such as the magnitude of a voltage or current, is converted to a digital representation of the quantity in terms of some arbitrary units.

The conversion can be done in the following way. First, the range of values in which the analogue quantity may lie is divided into a set of numbered, non-overlapping, adjacent, equal sub-ranges. Secondly the sub-range in which the analogue quantity lies is found—this determines the most significant digit of the conversion as the number of this sub-range. Finally the sub-range thus determined (which may in this prior art case be called a range) is subdivided and the process repeated for the enumeration of further digits. For example, the conversion of the magnitude of an initial voltage to its binary-digital equivalent has been accomplished in known converters by the process of comparing the initial voltage with a reference voltage, providing an output binary digit 1 and subtracting the reference voltage from the initial voltage only if the initial voltage is greater than the reference voltage and otherwise providing an output binary digit 0, and comparing the resulting voltage (that is to say the initial voltage or the initial voltage minus the reference voltage, as the case may be) with a new reference voltage having half the magnitude of the original reference voltage. An output binary digit of 1 or 0 is provided and subtraction of the new reference level from the resulting voltage does or does not take place according to whether the resulting voltage is respectively greater than or less than the new reference level. The process is repeated using successive reference levels of one half the magnitude of its immediately preceding reference level until the required degree of accuracy is obtained.

A disadvantage of such a system is that if for any reason the first or subsequent comparisons are inaccurate, the digital representation may be considerably in error.

It is an object of the present invention to provide an analogue-to-digital converter in which like errors are, in general, reduced.

The invention may be carried out by effectively subtracting from the analogue quantity, a quantity representing the lower limit of the sub-range in which the quantity lies after each determination has been made. This obviates the necessity of shifting the zero of each subsequent range so as to conform to the sub-ranges previously determined.

According to the present invention, therefore, there is provided an analogue-to-digital converter including means which determine a decreasing series of ranges and sub-ranges, means for deriving an initial analogue quantity from the analogue quantity to be represented in digital form, discriminating means for determining successively in which sub-range in each of a series of ranges a corresponding series of analogue quantities lie and subtraction means for deriving the quantities subsequent to the initial quantity in the corresponding series by effectively subtracting from the immediately preceding quantity in the series, a quantity equal to the lower limit of the last sub-range determined, the magnitude of any sub-range being less than the sum of the lower limits of the highest sub-ranges in subsequent ranges (where there are more than one subsequent range).

The quantity may be a voltage derived from a transducer and employed directly by the converter to provide a digital output or it may be a voltage generated in the converter from some other voltage or current applied thereto in such a manner that the magnitude is proportional to the applied voltage or current.

The working principles of the invention will now be demonstrated by means of the following example in which the magnitudes are voltages and the binary scale of notation is employed.

Let the quantity lie in the range 0 to 126 units of voltage and let the number of sub-ranges in this and each subsequent range be equal to seven. The first set of seven sub-ranges may then be less than 23 units (this sub-range really being 0 to 23 units), 23 to 39 units, 39 to 55 units, 55 to 71 units, 71 to 87 units, 87 to 103 units and greater than 103 units (the last sub-range really being 103 to 126 units). A second range 0 to 29 units has voltage sub-ranges of less than 5 units (this sub-range really being 0 to 5 units) 5 to 9 units, 9 to 13 units, 13 to 17 units, 17 to 21 units, 21 to 25 units and greater than 25 units. A third range 0 to 7 units has sub-ranges of less than 1 unit (this sub-range really being 0 to 1 units), 1 to 2 units, 2 to 3 units, 3 to 4 units, 4 to 5 units, 5 to 6 units and greater than 6 units.

It will be seen that the first range has sub-ranges of 23 units or 16 units. The second range has sub-ranges of 5 units or 4 units with the lower limit of the highest sub-range 25 units. The third range has sub-ranges of one unit with the lower limit of the highest sub-ranges 6 units. The magnitude of sub-ranges (16 or 23 units) in the highest range is less than the sum $(25+6=31)$ of the lower limits of the highest sub-ranges in the two subsequent ranges. Thus, for example, in the determination of a sub-range of the first range in which an analogue quantity lies, the result may be 16 units too low and yet be compensated by the subsequent two determinations in the second and third ranges.

Discriminators required to detect in which of the sub-ranges voltages lie are so constructed that if it is required to discriminate between two sub-ranges when a voltage to be discriminated on lies on the boundary between two sub-ranges, a discriminator will indicate only one of the two sub-ranges. For instance, if the initial voltage lies on 39 units, the discriminator concerned will indicate only one of the sub-ranges 23 to 39 units and 39 to 55 units and not both of these sub-ranges. In practice, it has been found that a certain amount of error in discrimination is permissible, the error being corrected by subsequent discriminations in further ranges.

Thus, for example, if the initial voltage applied to the converter be 63 units of voltage, the first discriminator would determine that the initial voltage lies in the sub-range of 55 to 71 units of voltage (of the range 0 to 126) and would give an output of 0110111 in the binary scale of numerical notation indicating the lower limit of 55 units. Subtraction of 55 units from the initial voltage of 63 units would then take place to yield a second voltage of 8 units. The second discriminator would then determine that the second voltage lies in the sub-range 5 to 9 units (of the range 0 to 29) and would give an output of 0000101 in the binary scale of numerical notation indicating the lower limit of 5 units. Subtraction of 5 units from the second voltage may then be undertaken to yield a third voltage of 3 units. A third discriminator may then determine that the third voltage lies in one of the sub-ranges 2 to 3 units or 3 to 4 units of voltage (of the range 0 to 7) and give an output of either 0000010 or 0000011 respectively.

The binary sum of the outputs from the three discriminators is 0111110 or 0111111 which is equal to 63 or 64 respectively in decimal arithmetic.

It will be clear to those versed in the art that subtracting the lower limit of a sub-range from the initial analogue quantity after each determination is equivalent to shifting the zero of each subsequent range from zero by an amount equal to the sum of the lower limits of the previously determined sub-ranges. Thus, in the above example, instead of 55 units being subtracted from the initial voltage, the second discriminator may be adjusted so that its range lies between 55 and 84 units instead of from 0 to 29 units.

In order that the present invention may be more easily understood, embodiments thereof will now be described, by way of example, with reference to the accompanying drawings in which—

Figure 2:
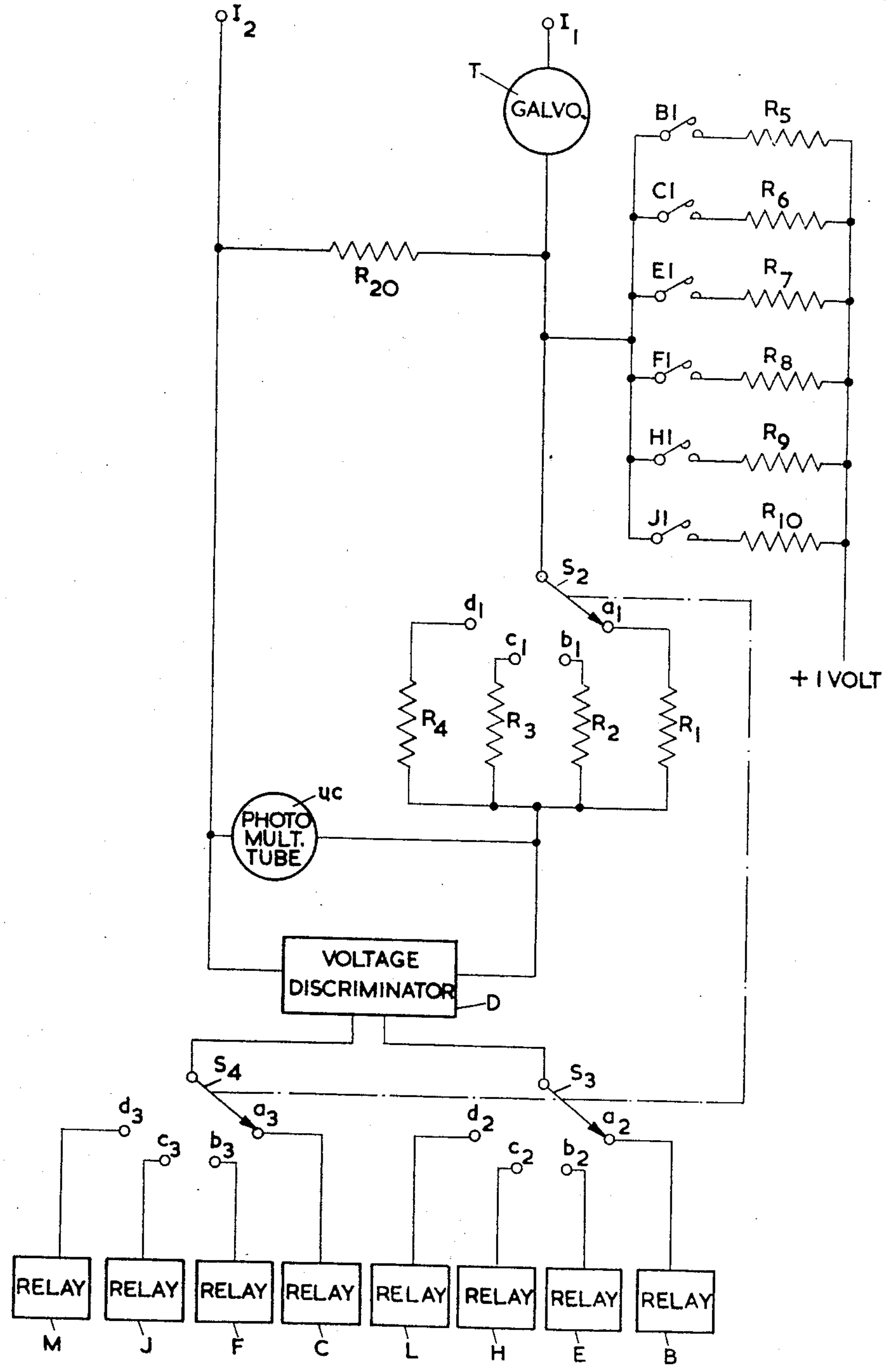
Figure 3:
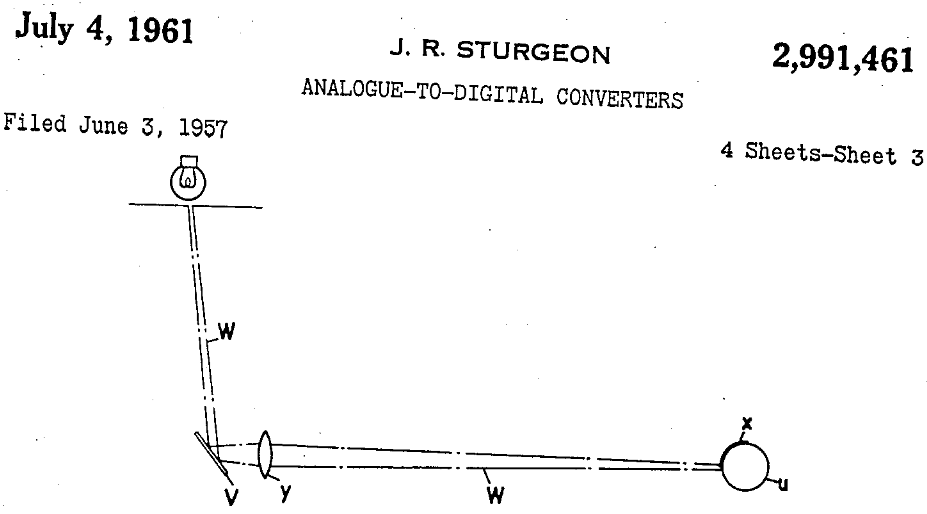
Figure 4:
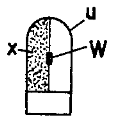
Figure 5:
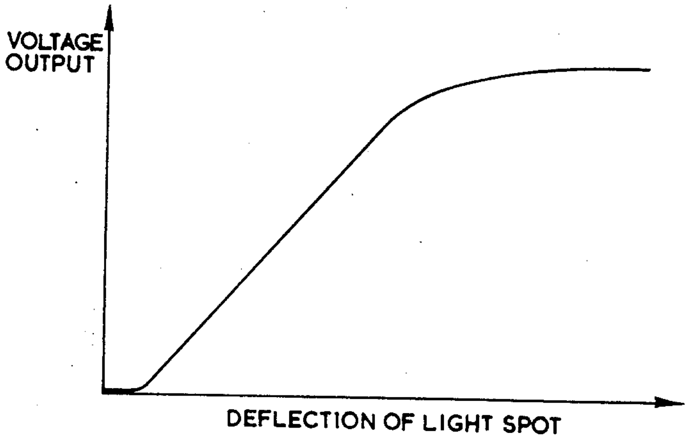
Figure 6:
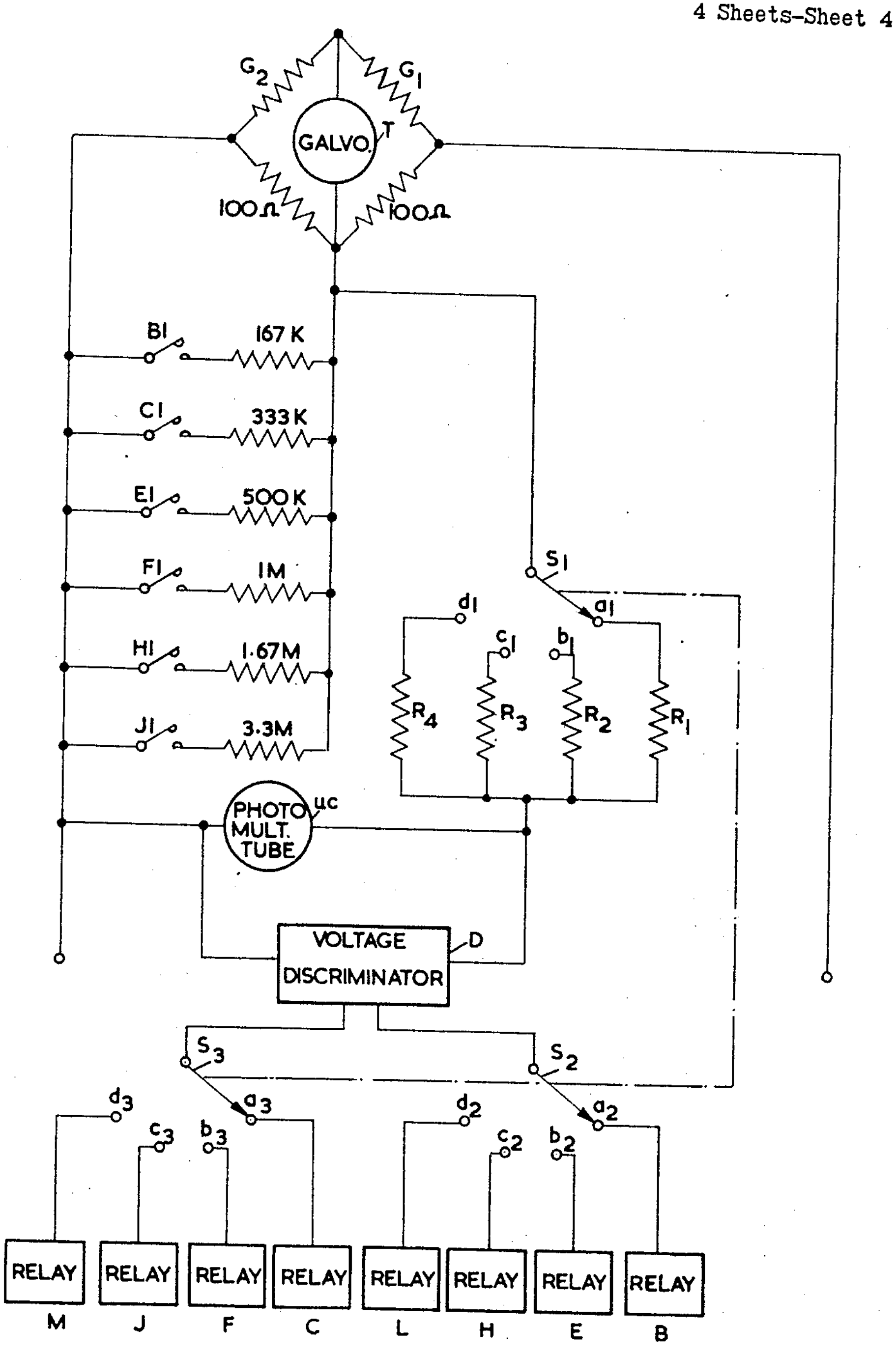

FIGURE 1 is a circuit diagram of an analogue-to-digital converter arranged to function in the decimal scale of notation, FIGURE 2 is a schematic circuit diagram of part of another analogue-to-digital converter embodying principles of operation similar to those of the embodiment shown in FIGURE 1, FIGURE 3 is a diagrammatic representation of the physical inter-relationship between some of the components shown in FIGURE 2, FIGURE 4 is a diagrammatic representation of part of a photo-multiplier tube illustrated in FIGURE 3, FIGURE 5 is a graph explanatory of the function of that part of an analogue-to-digital converter shown in FIGURE 2, and FIGURE 6 is a schematic circuit diagram of part of an analogue-to-digital converter in association with a strain-gauge bridge.

FIGURE 1 shows squares representing four high-gain phase-reversing direct-coupled amplifiers $A_1$, $A_2$, $A_3$ and $A_4$ having negative feedback resistors $R_1$, $R_2$, $R_3$ and $R_4$ connected between their inputs X1, X2, X3 and X4 and their outputs $V_1$, $V_2$, $V_3$ and $V_4$ respectively. Such amplifiers are commonly known as summing amplifiers since they provide an output voltage which is proportional to the algebraic sum of the input currents and are described, for example, on pages 238–239 of the book "High-Speed Computing Devices" by the staff of the Engineering Research Associates (McGraw-Hill Book Co., 1950). The inputs of the amplifiers $A_1$, $A_2$, $A_3$ and $A_4$ are connected to contacts *a, b, c,* and *d* respectively of a switch $S_1$. The movable contact of the switch $S_1$ is connected to an input terminal I through a resistor $R_{11}$. The junction X of the resistor $R_{11}$ and the movable contact of the switch $S_1$ is connected to the movable contacts $B_1$, $C_1$, $E_1$, $F_1$, $H_1$ and $J_1$ of six separate relays. The corresponding fixed contacts of these relays are connected through resistors $R_5$, $R_6$, $R_7$, $R_8$, $R_9$ and $R_{10}$ to a line maintained at +1 volt relative to earth. The switch $S_1$ may form part of a uniselector level for sequencing the operation of the converter. The switch $S_1$ has four positions *a, b, c* and *d* so that it can connect the junction X to any one of four voltage level discriminators BC, EF, HJ and LM, via the four amplifiers $A_1$, $A_2$, $A_3$ and $A_4$. The voltage level discriminators can be of any conventional design. Such devices are exemplified by Patents No. 2,486,390 and No. 2,612,550.

The voltage level discriminators each provide an output in a binary code on two different lines corresponding to any one of four voltage sub-ranges in which the voltage applied to the corresponding amplifier may lie. Such devices are well known and are described, for example, on pages 289–290 of the book "Control System Engineering" by Goode and Machel (McGraw-Hill Book Co.). For example, in the case of the discriminator BC, an output is provided on two, either one or none of the lines according to whether the input voltage $V_1$ the sub-range 0 to 30 volts, 30 to 60 volts, 60 to 90 volts or greater than 90 volts respectively. The voltage level discriminator BC is allowed a margin of error. Thus it is constructed in such a manner that if the voltage $V_1$ applied to it lies in the region 30 to 40 volts it will give an output indicative of either the sub-range 0 to 30 volts or 30 to 60 volts, but not both. Similarly, the voltage level discriminator BC gives only one of the two possible outputs in each of the two cases where its input voltage $V_1$ lies in the region 60 volts to 70 volts or 90 volts to 100 volts, these being the regions within which error is allowable. In practice, the discriminator may be set up so as to discriminate between the sub-ranges within these regions in which error is allowable.

When the switch S is on contact *a*, the circuit comprising the resistors $R_1$ and $R_{11}$ and the amplifier $A_1$ operates in the following manner. Let it be supposed that a voltage of $V_{in}$ is applied to the input I, that the voltage at the output $V_1$ of the amplifier $A_1$ is $V_1$ and that one or more of the relay contacts $B_1$ to $J_1$ is/are closed, introducing a resistance of value R into this part of the circuit. The values of the resistors $R_1$ to $R_{11}$ will be denoted by $R_1$ and $R_{11}$ respectively. The amplifier $A_1$ is phase-reversing and is of high gain so that the input point X may be regarded as being at earth potential. Therefore, $$V_1 = -V_{in}.R_1/R_{11} - R_1/R \quad (1)$$

If none of the relay contacts $B_1$ to $J_1$ are closed, then this equation is reduced to $$V_1 = -V_{in}.R_1/R_{11}$$

$R_1$ and $R_{11}$ may then be chosen so that an increment of, say, one volt in $V_1$ is produced by some desired increase in a negative-valued voltage $V_{in}$, for example, one micro-volt, or alternatively, by some desired increase in the current flowing through the resistor $R_{11}$, for example one micro-amp. Let it be assumed, by way of example, that $R_1 = 1$ megohm and that $R_{11} = 1$ ohm. Then, from Equation 1, $$V_1 = -(V_{in} + 1/R).10^6 \quad (2)$$

It follows that for a given value of $V_{in}$, the value of $V_1$ depends upon the value of R ($R_1$ and $R_{11}$ being constant). Thus by switching various values of R into the circuit, selected multiples of one volt may be subtracted from $V_1$. For example, by closing the relay contact $B_1$ and making $R = R_5 = 16.7$ kilohms, $V_1$ may be reduced by $1.10^6/16.7 \times 10^3$ volts; that is to say, by 60 volts. If $V_{in}$ is negative, this represents a decrease of 60 micro-volts in the apparent value of $|V_{in}|$, the modulus of $V_{in}$. Similarly, the closure of each one of the relay contacts $C_1$ to $J_1$ separately produces an apparent reduction in $|V_{in}|$ of 30 micro-volts, 20 micro-volts, 10 micro-volts, 6 micro-volts and 3 micro-volts respectively. That is to say, there is an apparent reduction in the magnitude of the negatively valued voltage $V_{in}$.

Similarly, output voltages $V_2$, $V_3$ and $V_4$, from the amplifiers $A_2$, $A_3$ and $A_4$ respectively may be obtained in terms of the input voltage $V_{in}$ by substituting the values of the resistors $R_2$, $R_3$ and $R_4$ respectively for the value of the resistor $R_1$ in Equation 1. Thus, if, as in this example, $R_2$, $R_3$ and $R_4$ have values of 3 megohms, 10 megohms and 30 megohms respectively, then $V_2$, $V_3$ and $V_4$ are given by:

$$V_2 = -3(V_{in} + 1/R).10^6 \quad (3)$$

$$V_3 = -10(V_{in} + 1/R).10^6 \quad (4)$$

$$V_4 = -30(V_{in} + 1/R).10^6 \quad (5)$$

The input voltage $V_{in}$ is arranged to be negative so that, as long as the term $1/R$ is never greater than the modulus of the term $V_{in}$ the voltages $V_1$ to $V_4$ are always positive. In this case, the term $1/R$ is effectively subtracted from the modulus of the term $V_{in}$ and may be used to produce new effective values of $V_{in}$. If the terms $(V_{in}-1/R)$ are in micro-volts, the voltages $V_1$, $V_2$, $V_3$ and $V_4$ will be this number of volts multiplied by the factors 1, 3, 10 and 30 respectively. It follows that if the discriminators BC, EF, HJ and LM are of substantially identical construction, the ranges of $(V_{in}-1/R)$ on which they discriminate will be progressively decreased by factors of 3, 10 and 30 respectively. The term $1/R$ is varied throughout the discriminating operations so as to bring $(V_{in}-1/R)$ within the ranges of each successive discriminator.

In the case of amplifier $A_1$, and the discriminator BC, there are initially no relay contacts $(B_1, C_1 \ldots J_1)$ closed and, therefore, the term $1/R$ in Equation 2 is zero. It follows that the voltage sub-ranges discriminated on by the discriminator correspond to similar sub-ranges, but expressed in micro-volts, in which the negative input voltage $(V_{in})$ may lie. The discriminator BC contains two relays which control the relay contacts $B_1$ and $C_1$ so that none, one or two of these relay contacts is/are closed corresponding to an output on one of the lines indicating the lower limit of one of the sub-ranges of the modulus of the voltage $V_{in}$ of the set 0 to 30 micro-volts, 30 to 60 micro-volts, 60 to 90 micro-volts and greater than 90 micro-volts respectively.

The voltage level discriminator EF has a similar function to the discriminator BC and is substantially identical in construction. The output given on its two output lines indicate in a binary code sub-ranges of the effective value of the modulus of the voltage $V_{in}$ of the set 0 to 10 micro-volts, 10 to 20 micro-volts, 20 to 30 micro-volts and greater than 30 micro-volts. The discriminator EF also has two relays which control the relay contacts $E_1$ and $F_1$ so that none, one or both of these contacts is closed according to where the effective value of the modulus of the voltage $V_{in}$ lies.

The voltage level discriminator HJ is similarly constructed to provide none, one or two outputs corresponding to ranges of the effective value of the modulus of the voltage $V_{in}$ of 0 to 3 micro-volts, 3 to 6 micro-volts, 6 to 9 micro-volts and greater than 9 micro-volts, and to close none, one or both of the relay contacts $H_1$ and $J_1$ according to where the input voltage lies.

The voltage level discriminator LM is also similarly constructed to provide four separate outputs corresponding to voltage sub-ranges of 0 to 1 micro-volts, 1 to 2 micro-volts, 2 to 3 micro-volts and greater than 3 micro-volts in which the effective value of the modulus of the voltage $V_{in}$ lies and to operate and close none, one or both of two of relays L and M (not shown).

Each of the four voltage level discriminators is so constructed that once an input voltage has been conveyed to them by means of the switch $S_1$, their outputs persist and the relay contacts which have been closed remain closed until the switch $S_1$ has moved from position *a* in the manner to be described hereinafter. The construction of such voltage level discriminators presents no difficulty and will be clear to those versed in the art.

Initially in the operation of the converter, the switch $S_1$ is switched to the contact *a* and a negative input voltage $V_{in}$ is applied to the input terminal I. The voltage level discriminator BC operates to indicate on one of its outputs the lower limit of the voltage sub-range in which the voltage $V_1$ lies (after a delay determined by the band-width and delay time of the amplifier $A_1$). It follows that the output from the discriminator BC indicates the lower limit of one of the sub-ranges 0 to 30 micro-volts, 30 to 60 micro-volts, 60 to 90 micro-volts and greater than 90 micro-volts in which the modulus of the input voltage $(V_{in})$ lies. The appropriate none, one or two, as the case may be, of the relay contacts $B_1$ and $C_1$ is closed effectively to subtract, or not, from $V_{in}$ the lower limit of the voltage sub-range in which the voltage $V_{in}$ lies as indicated by the discriminator BC. That is to say, the lower limit of the voltage range in which the modulus of the voltage $V_{in}$ lies is effectively subtracted from the modulus of the voltage $V_{in}$ if the appropriate relay contact or relay contacts is/are closed.

The switch $S_1$ is then moved to contact *b*. The indication from the voltage discriminator BC is maintained and the relay contacts $B_1$ and $C_1$ are maintained closed in the position already determined by the discriminator BC until the conversion from analogue to digital form is complete. The voltage discriminator EF then operates on the voltage $V_2$ at the output of the amplifier $A_2$. The output of the voltage discriminator EF then indicates the lower limit of the sub-range of the set 0 to 30 volts, 30 to 60 volts, 60 to 90 volts and greater than 90 volts in which the voltage $V_2$ lies. It follows that the output of the discriminator EF is indicative of the lower limit of the sub-ranges 0 to 10 micro-volts, 10 to 20 micro-volts, 20 to 30 micro-volts and greater than 30 micro-volts in which the modulus of the effective value of the voltage $V_{in}$ lies. At the same time, the appropriate none, one or two of the relay contacts $E_1$ and $F_1$ is/are closed effectively to subtract the indicated lower limit of the voltage range from the modulus of the effective value of the voltage $V_{in}$ so as to provide a new apparent effective value for $V_{in}$.

It will be clear to those versed in the art, that the closure of either or both of the relay contacts $B_1$ and $C_1$ may be regarded as shifting the range of voltages which the amplifier $A_2$ will accept for discrimination. For example, the closure of the relay $B_1$ may be regarded as shifting the range of voltages acceptable to the amplifier $A_2$ from 0 to $-40$ micro-volts to $-60$ to $-100$ micro-volts, instead of effectively subtracting $-60$ micro-volts from the input voltage. The action of the relay contacts $B_1$, $C_1$, $E_1$, $F_1$, $H_1$ and $J_1$ may be similarly regarded in relation to their effect upon the discriminators and amplifiers operating after their closure in the manner to be described hereinafter.

The switch $S_1$ is then moved to contact *c* when a similar action is taken by the voltage discriminator HJ, the appropriate ranges for the modulus of the new apparent effective voltage $V_{in}$ being 0 to 3 micro-volts, 3 to 6 micro-volts, 6 to 9 micro-volts and greater than 9 micro-volts. The appropriate none, one or two, of the relay contacts $H_1$ and $J_1$ is/are closed to provide a new apparent effective value for the modulus of the voltage $V_{in}$.

Lastly, the switch $S_1$ is moved to contact *d* and a similar action is taken by the voltage discriminator LM, the appropriate voltage ranges for the modulus of the apparent new voltage $V_{in}$ being 0 to 1 micro-volt, 1 to 2 micro-volts, 2 to 3 micro-volts and greater than 3 micro-volts.

Outputs from a network P of further relay contacts (not shown) of the voltage discriminators HJ and LM are passed in binary-coded decimal form to a decoder T whilst the outputs from a network Q of further relay contacts (not shown) of the voltage discriminators BC and EF are passed to a decoder V which is also fed with any carry digit from the network P. The networks P and Q may take the form of suitable tree circuits such as described, for example, at pages 115 to 119 in the book "Automatic Digital Calculators" by Booth and Booth, published by Butterworth's Scientific Publications (London, 1956). The decoder T provides an output on one of ten lines so as to provide an indication of the units digit of the sum in micro-volts of the indications from the outputs of the discriminators HJ and LM, the ten digit of this sum being passed to the decoder V. Decoders such as the decoders V and T are well known and are described, for example, in United States Patent No. 2,656,524 to Grindley at column 6 lines 63 et sequa in relation to FIGURE 7 thereof. The decoder V provides an output on one of ten lines so as to give an indication of the tens digit of the sum in micro-volts of the indications from the outputs of the discriminations BC and EF and the tens carry digit from the network P. An additional output from the network Q provides an indication of any hundreds digit which may result from the summation in the network Q. These outputs from the decoders indicate the value of the input voltage $V_{in}$ applied to the input terminal I.

In order to clarify the operation of the converter, an example will now be taken. Suppose the input voltage $V_{in}$ is $-39^1/2$ micro-volts. When the switch is moved to contact *a*, the initial voltage $V_1$ at the output from the amplifier $A_1$ will be $39^1/2$ volts. The discriminator BC provides an output indicative of $-30$ micro-volts and closes the relay contact $C_1$. This closure results in the reduction of the voltage $V_1$ by 30 volts to $9^1/2$ volts. When the switch S is moved to contact *b*, the output of the amplifier $A_2$ is $V_2=3V_1=28^1/2$ volts and the discriminator EF provides an output indicating no units and no further relay contact is closed. However, when the switch S is moved to contact *c*, the ouput of the amplifier $A_3$ is $V_3=10V_2/3=95$ volts and the discriminator HJ provides an output indicative of $-6$ micro-volts and the relay contact $H_1$ closes to subtract 60 volts from $V_3$ leaving $V_3$ equal to 35 volts. Alternatively, the discriminator HJ may give an output indicative of $-9$ micro-volts, in which case the relay contacts $H_1$ and $J_1$ would both close. This would subtract 90 volts from $V_3$ leaving $V_2$ equal to only 5 volts. When the switch S is moved to contact *d*, the output from the amplifier $A_4$ is $V_4=3V_3=105$ or 15 volts, as the case may be, and the discriminator LM provides an output indicative of $-3$ micro-volts or $-0$ micro-volt depending upon which of the two possible alternatives was selected by the discriminator HJ.

The decoder T will, therefore, give an output indicative of $-9$ micro-volts and the decoder V will give an output indicative of $-30$ micro-volts, the total indicated being $-39$ micro-volts.

The case will now be considered in which the original discrimination of the discriminator BC was in error due to improper adjustment or to the circuit not having settled down sufficiently when this discrimination was made. Thus, let it be supposed that when the switch $S_1$ is moved to contact *a*, the discriminator BC provides an output indicative of no micro-volts and that no relay contact is closed. When the switch S is now moved to contact *b*, the discriminator EF will provide an output indicative of $-30$ micro-volts and the relay contact $E_1$ and $F_1$ will be closed, subtracting 90 volts from the initial value of $V_2$ and effectively subtracting $-30$ micro-volts from the input voltage $V_{in}$. The error created by the faulty first discrimination is, therefore, corrected by the second discrimination. The remainder of the operation is similar to that described in the previous example.

FIGURE 2 shows a galvanometer and photo-multiplier circuit which may be used to replace part of the circuit shown in FIGURE 1. In the circuit shown in FIGURE 2, a mirror galvanometer T and a resistor $R_{20}$ are connected in series between two input terminals $I_1$ and $I_2$. The junction between the galvanometer T and the resistor $R_{20}$ is connected to a set of relay contacts $B_1$, $C_1$, $E_1$, $F_1$, $H_1$ and $J_1$ and resistors $R_5$ to $R_{10}$ which are similar to those bearing the same references in FIGURE 1. The output of a photo-multiplier tube circuit UC is connected to the input of a discriminator D and is also connected across the resistor $R_{20}$ via a switch $S_2$ and one of set of resistors $R_1$, $R_2$, $R_3$ and $R_4$. These resistors each have a different value one from another and have a similar function to the resistors bearing the same reference in FIGURE 1.

The output from the discriminator D is connected to two switches $S_3$ and $S_4$ which are both ganged to the switch $S_2$. The switches $S_3$ and $S_4$ connect the output of the discriminator alternatively to pairs of relays B and C, E and F, H and J and L and M. These relays have a similar function to the relays in the discriminators shown in FIGURE 1, except that they are actuated in turn by the output from the single discriminator D. This modification reduces the number of discriminators required to perform the same function. It could be performed equally well in the circuit of FIGURE 1 by a single discriminator connected in turn to the outputs of the amplifiers $A_1$ to $A_4$ by means of a switch ganged to the switch $S_1$.

The discriminator D consists merely of two additional relays which are arranged to operate at two separate threshold voltages of the output of the photo-multiplier tube circuit UC. These relays are employed to control the operation of the relay pairs B and C etc., in sequence as the switches $S_2$, $S_3$ and $S_4$ are moved from one contact to the next.

FIGURE 3 shows diagrammatically the physical interrelationship between the mirror V of the galvanometer T and the photo-multiplier tube U of the circuit UC. A narrow beam of light W from a lamp having a straight filament is focused on to the photo-multiplier tube U (via the mirror V) by a lens Y of the galvanometer. Half of the face of the photo-multiplier tube UC facing the mirror V is blackened so that light is not transmitted through the blackened portion of the face to the interior of the tube. This blackened portion of the face is shown labelled X.

FIGURE 4 shows part of the photo-multiplier tube UC, the blackened portion of its face being shown speckled and labelled X. The light beam W is shown impinging on the face of the tube so that only a portion of the beam is allowed to pass through the face of the tube. The image of the lamp filament is initially focussed on to the blackened portion of the face of the photo-multiplier tube.

FIGURE 5 is a graph showing the relationship between the voltage output of the photo-multiplier tube circuit UC plotted against the deflection of the light beam W. The minimum voltage output represents the condition in which the light beam W impinges on the blackened portion X of the tube face, the maximum voltage output represents the condition in which all of the light beam for all practical purposes may be regarded as passing through the tube face and the intermediate voltage outputs represent the conditions in which the light beam partially impinges on to the blackened portion X of the tube face.

Normally, with the resistor $R_1$, $R_2$, $R_3$ or $R_4$ replaced by an open circuit, a small input to the galvanometer T will result in a large change in output voltage from the photo-multiplier tube UC. However, with one of the resistors $R_1$ to $R_4$ in circuit a negative feedback current may be applied to the galvanometer T so that the position of the light beam W on the face of the photo-multiplier tube UC varies only slowly with quite large increments of input to the galvanometer T. In effect, therefore, this circuit arrangement (including the switch $S_2$, which provides a form of serial operation) is equivalent to the high-gain amplifier circuits shown in FIGURE 1. Furthermore, by applying current from an external source of the galvanometer winding and the resistor $R_{20}$ through one or more of the relay contacts $B_1$, $C_1$, $E_1$, $F_1$, $H_1$ and $J_1$ in a manner similar to that described with reference to the relay contacts $B_1$ to $K_1$ and resistors $R_3$ to $R_{11}$ in FIGURE 1, known increments of voltage may be subtracted from the output of the photo-multiplier tube UC.

The function of the analogue-to-digital converter described with reference to FIGURES 2 to 5 is similar to that shown in FIGURE 1 and will now be briefly described. The input voltage which is to be operated upon is applied to the input terminals $I_1$ and $I_2$. The switches $S_2$, $S_3$ and $S_4$ are initially set in positions $a_1$, $a_2$ and $a_3$ respectively. The discriminator D operates and energises none, one or both of the relays B and C. The appropriate none, one or two of the relay contacts $B_1$ and $C_1$ is/are closed effectively to subtract, if necessary, the appropriate voltage from the input voltage. The relays B and C are arranged to remain operated once energised as are also the relays E, F, H, J and M. The switches $S_2$, $S_3$ and $S_4$ are then moved to positions $b_1$, $b_2$ and $b_3$ respectively. (The galvanometer circuit is made more sensitive by the switch $S_2$ switching in the resistor $R_2$ in replacement for the resistor $R_1$.) The discriminator D again operates, this time to energise the appropriate none, one or both of the relays E and F. The corresponding none, one or both of the relay contacts $E_1$ and $F_1$ is/are closed. The switches $S_1$ to $S_3$ are then moved to the positions $c_1$, $c_2$ and $c_3$ and, eventually to the positions $d_1$, $d_2$ and $d_3$, the appropriate relays, if any, being energised by the operation of the discriminator D at each stage. Contacts (not shown) of the relays B, C, E, F, J, H, L and M form networks similar to the networks P and Q shown in FIGURE 1 and the outputs from these networks may be decoded into true decimal form by means of decoders as shown at T and V in FIGURE 1.

In order to attain a higher operating speed, it may be advantageous to sacrifice some accuracy by converting the two switching operations to positions $c_1$ etc. and $d_1$ etc. to one switching operation, a separate discriminator having thirteen ranges of discrimination then being used.

FIGURE 6 shows an analogue-to-digital converter of the form described with reference to FIGURES 2 to 5, adapted to convert to digital form the measurements of a strain-gauge bridge.

In FIGURE 6, those circuit elements performing the same functions as the corresponding elements shown in FIGURE 2 are designated by the same reference numerals as are shown in FIGURE 2. The dummy gauge and the live guage of the strain gauge bridge are shown at $G_1$ and $G_2$ respectively. The galvanometer T is in this case connected across the bridge so as to have a voltage $V_{in}$ (proportional to the unbalance of the bridge) applied thereto. The relay contacts $B_1$, $C_1$, $E_1$, $F_1$, $H_1$ and $J_1$ serve to correct, as far as possible, the balance of the bridge. The output of the bridge circuit will be in units each of which represents a change of 0.001 percent in the resistance of the live gauge $G_2$.

The switching operations in the above-described embodiments may be conveniently carried out by means of uniselectors (not shown). The movement of such uniselectors may be controlled by a pulsing unit (not shown) which may also be used to control output printers and the like. These components do not, however, form part of the main invention and have been omitted from the drawings in the interests of clarity.

I claim:

1. An analogue-to-digital converter including means which determine a series of ranges and sub-ranges of decreasing magnitude such that the magnitude of a sub-range in a range of higher magnitude is less than the sum of the lower limits of the highest sub-ranges in ranges of lower magnitude, means for deriving an initial analogue quantity from the analogue quantity to be represented in digital form, incorporated in the first-named means discriminating means for determining successively in which sub-range in each of the series of ranges a corresponding series of analogue quantities lie and subtractor means for deriving the quantities subsequent to the initial quantity in the corresponding series by effectively subtracting from the immediately preceding quantity in the series, a quantity equal to the lower limit of the last sub-range determined.

2. An analogue-to-digital converter as claimed in claim 1 and wherein there is provided means connected to the discriminating means for summing the digital output thereof and for providing a digital output which is directly proportional to the sum of the lower limits of the sub-ranges determined by the discriminating means.

3. An electrical analogue-to-digital converter as claimed in claim 1 and wherein the discriminating means includes a summing amplifier, a resistor through which an analogue voltage the magnitude of which is to be digitally represented may be applied to the amplifier and a discriminator connected to the output of the amplifier for operating the subtractor means.

4. An electrical analogue-to-digital converter as claimed in claim 3 and wherein the subtractor means includes a source of constant voltage and means for connecting the source of constant voltage to the input of the amplifier through a resistance selected by the discriminator so as to reduce the voltage output of the amplifier by a voltage directly proportional to the lower limit of the sub-range determined by the discriminator.

5. An analogue-to-digital converter as claimed in claim 4 and wherein there is provided a number of summing amplifiers and discriminators equal to the number of ranges, means connecting all but one of the discriminators to the subtracting means and switch means for connecting the said resistor and the subtracting means to each of the amplifiers in sequence.

6. An analogue-to-digital converter as claimed in claim 4 and wherein the summing amplifier includes a mirror galvanometer, a photo-electric cell arranged to receive light from the mirror galvanometer and feedback means for feeding back the output of the photo-electric cell to the input of the mirror galvanometer so as to oppose the movement of the galvanometer.

7. An analogue-to-digital converter as claimed in claim 6 and wherein the feedback means includes a plurality of resistors selected by a selector switch so as to increase the sensitivity of the galvanometer circuit after each range determination has been made.

8. An analogue-to-digital converter as claimed in claim 7 and wherein the photo-electric cell is a photo-multiplier arranged to provide an output voltage directly proportional to the movement of the galvanometer and wherein the discriminator is connected to the output of the photo-electric cell.

9. An analogue-to-digital converter as claimed in claim 8 and wherein the discriminator is arranged to operate in sequence a plurality of relays which control the subtractor means.

10. An analogue-to-digital converter as claimed in claim 9 and wherein the mirror galvanometer is connected to a bridge circuit so that the unbalance voltage thereof is applied to the galvanometer.

11. An analogue-to-digital converter as claimed in claim 10 and wherein the bridge circuit is a strain-gauge bridge.

12. In an analogue-to-digital converter, a digitizing system comprising means for deriving an initial analogoue quantity from the analogue quantity to be represented in digital form, connected to the said means discriminating means for providing output signals derived by determining successively in which sub-range in a series of ranges of decreasing magnitude a corresponding series of analogue quantities lie and subtractor means connected to both the first-named means and to the discriminating means for deriving the quantities subsequent to the said initial quantity in the said corresponding series by effectively subtracting from the immediately preceding quantity in the series a quantity equal to the lower limit of the last sub-range determined, the discriminating means having a plurality of threshold means for defining the lower limits of the said sub-ranges with the magnitude of sub-ranges in ranges of higher magnitude being less than the sum of the lower limits of the highest sub-ranges in subsequent ranges.

13. In an analogue-to-digital converter, a digitizing system as claimed in claim 12 and wherein the discriminating means comprises a plurality of summing amplifiers, at least two threshold device connected to the output of each summing amplifier for operating the subtractor means and for providing a digital output, and switching means for connecting analogue quantities in the said series of analogue quantities to the inputs of the summing amplifiers in turn.

14. In an analogue-to-digital converter, a digitizing system as claimed in claim 13 and wherein the said means for deriving an initial analogue quantity from the analogue quantity to be represented in digital form includes a resistor connected between an input to the digitizer and the said switching means.

15. In an analogue-to-digital converter, a digitizing system as claimed in claim 14 and wherein the subtractor means comprises a source of constant voltage and means operated by the said discriminating means for connecting the source of constant voltage through a resistance to the junction of the said resistor and the said switch so as to reduce the voltage output of an amplifier by a voltage directly proportional to the sum of the lower limits of sub-ranges determined by the said threshold means.

16. In an analogue-to-digital converter, a digitizing system comprising means for deriving an initial analogue quantity from the analogue quantity to be represented in digital form, discriminating means connected to the first named means for determining successively in which sub-range in a series of ranges of decreasing magnitude a corresponding series of analogue quantities lie and subtractor means connected to both the first named means and to the discriminating means for deriving the quantities subsequent to the said initial quantity in the said corresponding series by effectively subtracting from the immediately preceding quantity in the series a quantity equal to the lower limit of the last sub-range so determined, and wherein the said discriminating means comprises a variable sensitivity summing amplifier and discriminator for defining the lower limits of the said sub-ranges with the magnitude of sub-ranges in ranges of higher magnitude being less than the sum of the lower limits of the highest sub-ranges in subsequent ranges, and means for varying the sensitivity of the amplifier after each successive determination.

17. In an analogue-to-digital converter, a digitizing system as claimed in claim 16 and wherein the means for deriving an initial analogue quantity from the analogue quantity to be represented is a bridge circuit the output of which is connected to the discriminating means.

18. In an analogue-to-digital converter, a digitizing system as claimed in claim 16 and wherein the variable sensitivity summing amplifier is a mirror galvanometer, a photo-electric cell arranged to receive light from the mirror galvanometer, feedback means for feeding back the output of the photo-electric cell to the input of the mirror galvanometer so as to oppose the movement thereof and means for varying the amount of feedback.

19. In an analogue-to-digital converter, a digitizing system as claimed in claim 15 and wherein there is provided means connected to the discriminating means for summing the digital output thereof.

References Cited in the file of this patent

UNITED STATES PATENTS

| | | |
|---|---|---|
| 2,630,562 | Johnson | Mar. 3, 1953 |
| 2,715,724 | Oberman | Aug. 16, 1955 |
| 2,754,503 | Forbes | July 10, 1956 |
| 2,784,396 | Kaiser | Mar. 5, 1957 |